May 8, 1928.  1,669,104

J. J. STOCK

AMUSEMENT DEVICE

Filed Nov. 5, 1921

WITNESSES

INVENTOR
JOHN J. STOCK
BY
ATTORNEYS

Patented May 8, 1928.

1,669,104

UNITED STATES PATENT OFFICE.

JOHN J. STOCK, OF PHILADELPHIA, PENNSYLVANIA.

AMUSEMENT DEVICE.

Application filed November 5, 1921. Serial No. 513,022.

My invention relates to an amusement device, and more particularly to a system of control which shall provide certain improvements over my prior Patent, #1,339,299, issued May 4, 1920; as well as over the pending application of Stock, et al., on a trolley system, filed April 18, 1921, #462,307.

More particularly my present invention aims to improve the amusing features of a device of the general nature seen in my above patent by taking the control of the driving connections of the traction members out of the hands of a central operator and placing this control individually in the hands of a number of occupants of the vehicle whose concerted action is highly improbable, even if possible, and whose independent action precludes any real directional control of the vehicle and is most likely to produce highly erratic and highly amusing and entertaining movements.

As distinguished from my above patent I also provide for taking the control of the starting and stopping of the machine entirely out of the hands of either an operator or the occupants of the vehicle and placing the same at such a point that a series of vehicles may be started and stopped at the same time, the movements of each vehicle between starting and stopping being alone in the hands of the occupants and this control distributed in several hands as above stated.

Figure 1:
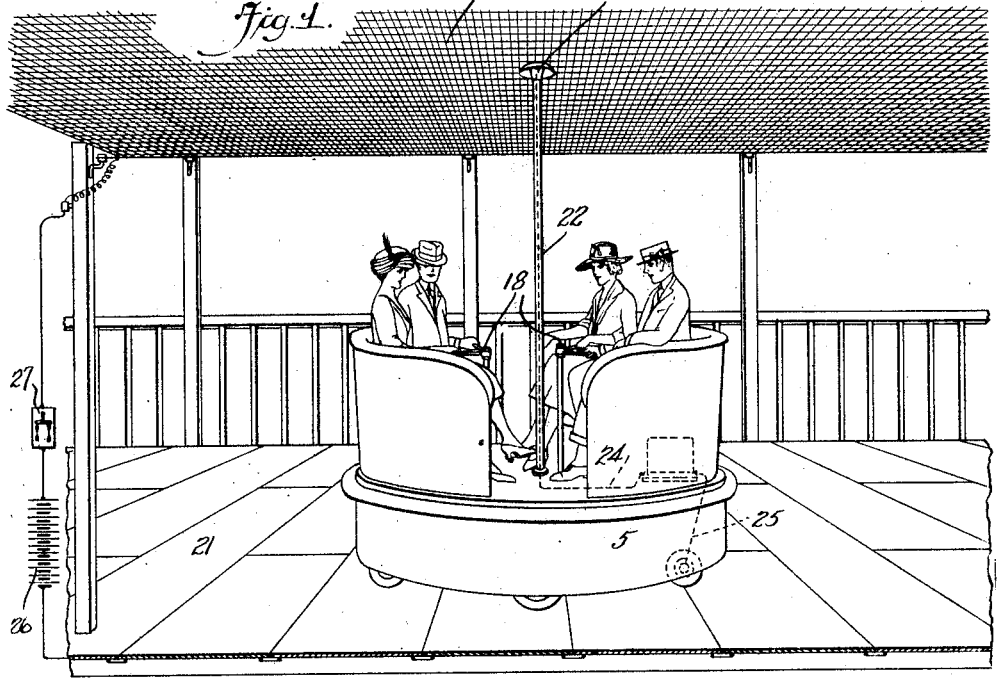
Figure 2:
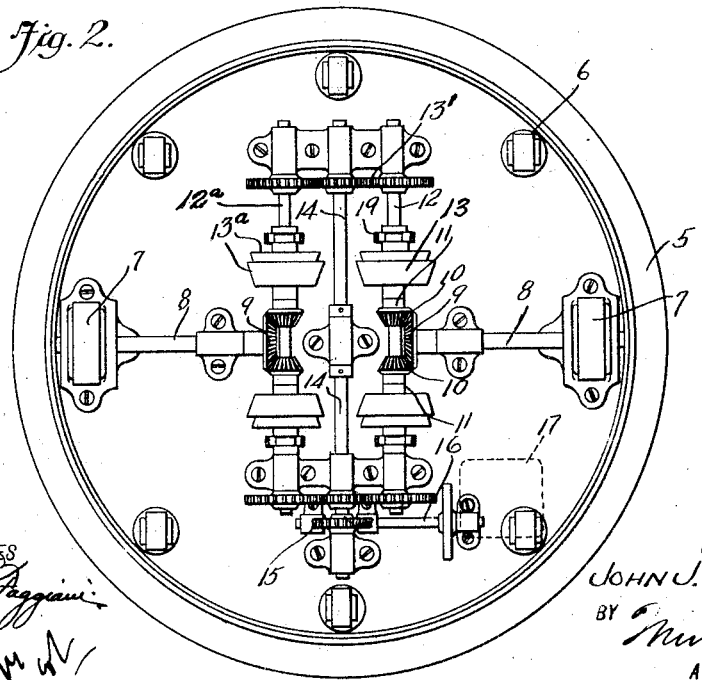

In the accompanying drawing which illustrates my present invention and forms a part of this specification, Figure 1 is a somewhat diagrammatic perspective view showing my amusement device in operation, in connection with my improved system, and Figure 2 is a bottom plan view of the said amusement device.

As in my prior patent, it will be seen, reference being had to Figure 2, that an amusement device has been illustrated, which includes a body 5, adapted to be movably supported upon a suitable surface by means of universally movable casters 6. A positive movement of the vehicle is effected by means of driving wheels 7, which latter are operated in a manner hereinafter described, and frictionally contact with the supporting surface so that upon their being revolved the vehicle will be moved.

Also, as in my prior patent, it will be noted that each of the driving wheels is supported upon the outer end of a shaft 8, these two shafts 8 being mounted in axial alignment with their inner ends spaced apart and provided with opposed bevel gears 9. Each of these bevel gears 9 is engaged by spaced opposing bevel gears 10 rotatable on a shaft 12 with one of the clutch members of each of two clutches 13, the coacting clutch member of each of said clutches being rotatable with but movable axially of said shaft 12 according to familiar clutch design. Associated with each clutch 13, also in a manner well known, is a shifting yoke 19, whereby the male member of either clutch may be advanced into or removed from contact with the other member of its clutch while the shaft 12 is rotating and to cause one of the gears 10 and consequently the associated wheel 7 to rotate with shaft 12 or to idle while the latter is rotating and to cause said wheel 7 to rotate in one direction or the other according to which gear 10 is thus clutched to shaft 12.

Of course it is conceivable that the two yokes 19 associated with the clutches on shaft 12 might be both operated simultaneously and in such manner as to clutch both gears 10 at the same instant to shaft 12; but the only result of this would be to momentarily stall the motor for driving, as hereinafter described, and hence stop the car or reduce its momentum, until one or the other of the occupants of the car operating the yokes governing the two clutches on shaft 12 moves at least one of such yokes to release at least one of the clutches.

In order that two propelling floor wheels 7 may be provided, there is present in addition to the shaft 12 just described, another and identically equipped shaft 12$^a$ as shown to the left of Fig. 2; such shaft 12$^a$ carrying clutches 13$^a$.

The two shafts 12 and 12$^a$ are mounted in spaced parallel relation and geared adjacent to their outer ends by gearing 13' with the opposite end portions of an intermediate transmission shaft 14. Shaft 14 is connected at one end by gearing 15 with a shaft 16 in turn geared to an electric motor 17.

It will thus be seen that each shaft 12 and 12$^a$ is provided with a pair of clutches by means of which the direction of rotation of the associated traction wheel 7 may be controlled. Furthermore, by disconnecting both of the clutches of one of the shafts 12 and 12ª, the associated wheel 7 will remain stationary.

In providing for independent control of the clutches 13 and 13ª by a series of occupants of the car rather than an operator having a station in the car as contemplated in my prior patent, I preferably utilize a series of control levers or handles 18 as shown in Fig. 1, corresponding in number to the clutches, these levers or handles being individually operatively connected (by any suitable means, not shown) to one of the clutches, each handle and consequently each clutch under the control of one of the four occupants or passengers, if, in a car equipped with merely four clutches as in the drawing, and not with a greater number of clutches, accommodations for no more than four passengers are provided.

In connection with Figure 1 it will further be noted that I have illustrated the same control system for the motor, as has been shown in my pending application afore-referred to, thus in this latter figure the reference numeral 20 indicates a conducting ceiling and 21 a floor possessing electrical conductivity, a control pole 22 being secured to the body of the vehicle 5 and extending upwardly therefrom, so that the collector 23 associated with this pole may effect a contact with the ceiling 20. An uninterrupted electrical lead 24 has one of its ends secured to the collector 23, its opposite end being coupled with the motor 17, and a further lead 25 extends between the opposite terminal of the motor 17, and is slidably grounded through the vehicle to the floor 21. Thus the motor is continuously in electrical circuit with the ceiling and floor, and a suitable source of energy 26 is connected with the floor and ceiling respectively, it being noted however, that contrary to my usual construction, that the entire circuit may be broken by a switch 27, positioned at a point beyond the control of the operator of the vehicle.

It will be appreciated, in connection with a ride of this type, that it is conceivable that one or more operators, who are thoroughly conversant with the structure and operation of the vehicle, would be capable of manipulating the controls 18, in such a manner as to steer the vehicle to any desired point, or to follow virtually any course, which might be laid out. However, due to the fact that the switch 27 is not in the control of the persons within the vehicle, and further, incident to the fact that the participants in the ride would be virtually incapable of solving the correct control of the vehicle to reach any desired point, or to properly steer the vehicle, that the said vehicle will follow an extremely erratic course over the supporting surface, to the great amusement of the participants in the ride, it being further seen that the motor 17 may not be caused to stop until the switch 27 is thrown.

Further the feasibility of the operator controlling all the movement of the vehicle is diminished, incident to the reason that the control of said vehicle is divided; i. e. a different operator actuates the different sets of clutch parts, thus precluding the possibility of a synchronous and correct throwing of these parts to deliberately steer the vehicle.

Thus it will be readily understood, that although the steering mechanism provided by the driving parts is controllable, that each of the vehicles of the ride will normally follow an erratic course, the said vehicles turning clock-wise, anti-clock wise, moving forward, rearward etc. and bumping into each other, until such time as the motors 17 are caused to stop operating by the throwing of the switch 27, and thus the objects of this invention will be achieved, it being further understood that numerous modifications of structure might readily be resorted to without in the least departing from the scope of my claim; which is:

In a public amusement apparatus, the combination with an electrically charged floor and ceiling, of a motor car having at the underside of its platform a circular series of travellers adapted to move in any direction on the charged floor, and at its upper side provided with a plurality of seats for the patrons, a pair of diametrically opposite driving wheels mounted in fixed locations at the underside of the car platform, a pair of clutch devices geared directly to each driving wheel, and an electric motor included in the electrical ciruit, with the charged floor and ceiling, and having a common driving connection with all four clutches, and a clutch controlling handle for the occupant of each seat, whereby one or more clutches may be engaged or disengaged at a time.

JOHN J. STOCK.